(12) United States Patent
Li (10) Patent No.: US 11,748,274 B2
(45) Date of Patent: Sep. 5, 2023

(54) BANKED MEMORY DEVICE STORING HAMMING WEIGHT

(71) Applicant: Nuvoton Technology Corporation, Hsinchu Science Park (TW)

(72) Inventor: Yu-Shan Li, Tainan (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 154 days.

(21) Appl. No.: 17/014,239

(22) Filed: Sep. 8, 2020

(65) Prior Publication Data

US 2021/0073146 A1    Mar. 11, 2021

(30) Foreign Application Priority Data

Sep. 9, 2019   (TW) ................... 108132365

(51) Int. Cl.
| | |
|---|---|
| *G06F 12/14* | (2006.01) |
| *G06F 13/16* | (2006.01) |
| *G06F 21/79* | (2013.01) |
| *G06F 21/75* | (2013.01) |
| *G06F 12/02* | (2006.01) |
| *H03M 13/19* | (2006.01) |
| *H03M 13/11* | (2006.01) |

(52) U.S. Cl.
CPC ...... *G06F 12/1441* (2013.01); *G06F 12/0246* (2013.01); *G06F 13/1647* (2013.01); *G06F 13/1668* (2013.01); *G06F 21/755* (2017.08); *G06F 21/79* (2013.01); *H03M 13/1108* (2013.01); *H03M 13/19* (2013.01); *G06F 2212/40* (2013.01)

(58) Field of Classification Search
None
See application file for complete search history.

(56) References Cited

U.S. PATENT DOCUMENTS

| | | | |
|---|---|---|---|
| 6,549,483 B2 * | 4/2003 | Kurjanowicz ....... | G11C 7/1045 365/189.08 |
| 9,886,597 B2 * | 2/2018 | Bringer .................... | H03M 7/20 |
| 10,073,661 B2 | 9/2018 | Pedersen et al. | |
| 10,944,435 B1 * | 3/2021 | Fay ....................... | G06F 11/1012 |
| 2008/0144363 A1 * | 6/2008 | Lee ......................... | G11C 29/08 365/201 |
| 2012/0246432 A1 * | 9/2012 | Hadley ................ | G06F 12/0223 711/E12.002 |
| 2016/0098200 A1 * | 4/2016 | Guz ......................... | G06F 7/00 711/154 |

OTHER PUBLICATIONS

Mohammad et al. "Phase Change Memory Faults." Jan. 2006. IEEE. VLSID'06.*

* cited by examiner

*Primary Examiner* — Nathan Sadler
(74) *Attorney, Agent, or Firm* — Muncy, Geissler, Olds & Lowe, P.C.

(57) ABSTRACT

A memory device includes a memory array and a memory controller. The memory array includes a first memory bank, a second memory bank, and a third memory bank. The first memory bank includes a first sub memory bank. The second memory bank includes a second sub memory bank. The memory controller, according to a write command from a host, writes first data from the host to the first memory bank and second data to the second memory bank at the same time, and writes a first Hamming weight of the first data to the third memory bank. The second data is the inverse of the first data.

10 Claims, 6 Drawing Sheets

BANKED MEMORY DEVICE STORING HAMMING WEIGHT

CROSS REFERENCE TO RELATED APPLICATIONS

This Application claims priority of Taiwan Patent Application No. 108132365, filed on Sep. 9, 2019, the entirety of which is incorporated by reference herein.

BACKGROUND OF THE INVENTION

Field of the Invention

The disclosure relates generally to memory devices and write methods and reading methods thereof, and more particularly it relates to memory devices with security and write methods and reading methods thereof.

Description of the Related Art

Since the power consumption of a static random access memory (SRAM) being written or read with logic "0" and logic "1" may be different, this allows hackers to know the real content of the SRAM being written or read through changes in power consumption when the hackers understand the real power consumption of a SRAM being written or read with logic "0" and logic "1". Therefore, a more efficient method is needed to maintain the security of the confidential information.

BRIEF SUMMARY OF THE INVENTION

In an embodiment, a memory device comprises a memory array and a memory controller. The memory array comprises a first memory bank, a second memory bank, and a third memory bank. The first memory bank comprises a first sub memory bank. The second memory bank comprises a second sub memory bank. The memory controller simultaneously writes first data from a host into the first memory bank and second data into the second sub memory bank according to a write command from the host, and writes the first Hamming weight of the first data into the third memory bank, wherein the second data is the inverse of the first data.

According to an embodiment of the invention, the memory device further comprises a fourth memory bank. The fourth memory bank is configured to store a second Hamming weight, wherein the second Hamming weight is the inverse of the first Hamming weight, wherein the memory controller simultaneously writes the first Hamming weight into the third memory bank and the second Hamming weight into the fourth memory bank.

According to an embodiment of the invention, the memory controller further comprises a Hamming weight decoder. The Hamming weight decoder is configured to count the first data having a first bit count of a first logic to generate the first Hamming weight according to the first bit count, and to generate the second Hamming weight.

According to an embodiment of the invention, when the memory controller receives a read command from the host to read the first data from the first memory bank, the memory controller simultaneously reads the first Hamming weight from the third memory bank and the second Hamming weight from the fourth memory bank, wherein the memory controller generates first fake data according to the first Hamming weight, writes the first fake data into the first sub memory bank and writes the second fake data into the second sub memory bank, wherein the second fake data is the inverse of the first fake data, wherein the memory controller simultaneously reads the first data and the second fake data and transmits the first data to the host.

According to an embodiment of the invention, wherein the memory controller further comprises a Hamming weight decoder. The Hamming weight decoder generates the first fake data having the first Hamming weight and generates the second fake data. The second fake data is the inverse of the first fake data. Each of the first data and the first fake data has a first bit count of a first logic and a second bit count of a second logic.

In an embodiment, a writing method adapted to a memory array is provided. The memory array comprises a first memory bank and a second memory bank, wherein the first memory bank comprises a first sub memory bank and the second memory bank comprises a second sub memory bank. The writing method comprises receiving a write command and first data from a host; writing the first data into the first memory bank and simultaneously writing second data into the second sub memory bank, wherein the second data is the inverse of the first data; and writing the first Hamming weight of the first data into the third memory bank of the memory array.

According to an embodiment of the invention, the writing method further comprises generating a second Hamming weight, wherein the second Hamming weight is the inverse of the first Hamming weight; and when writing the first Hamming weight of the first data into the third memory bank of the memory array, simultaneously writing the second Hamming weight into the fourth memory bank of the memory array.

In an embodiment, a reading method adapted to a memory array is provided. The memory array comprises a first memory bank storing first data, a second memory bank and a third memory bank storing the first Hamming weight of the first data, wherein the first memory bank comprises a first sub memory bank and the second memory bank comprises a second sub memory bank. The reading method comprises receiving a read command from a host to read the first data from the first memory bank; reading the first Hamming weight, wherein the first Hamming weight indicates that the first data has a first bit count of a first logic and a second bit count of a second logic; generating first fake data according to the first Hamming weight, wherein the first fake data has the first bit count of the second logic and the second bit count of the first logic; writing the first fake data into the second sub memory bank; and simultaneously reading the first data and the first fake data.

According to an embodiment of the invention, the reading method further comprises when reading the first Hamming weight, simultaneously reading a second Hamming weight from a fourth memory bank of the memory array, wherein the second Hamming weight is the inverse of the first Hamming weight; and after the step of simultaneously reading the first data and the first fake data, only transmitting the first data to the host.

According to an embodiment of the invention, the step of generating first fake data according to the first Hamming weight further comprises generating second fake data according to the first Hamming weight, wherein the second fake data has the first bit count of the first logic and the second bit count of the second logic; and inversing the second fake data to generate the first fake data.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It should be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It should be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

Figure 1:
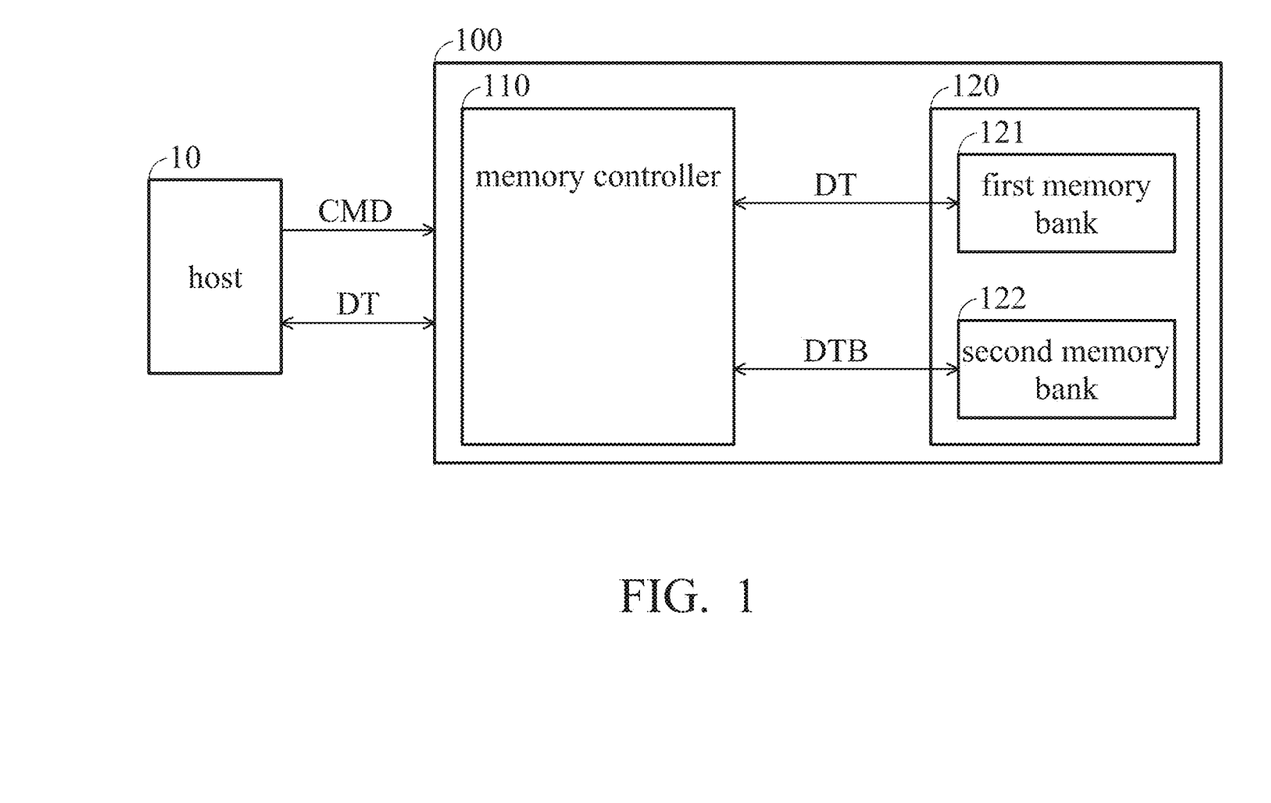
FIG. 1 is a block diagram of a memory device in accordance with an embodiment of the invention.

FIG. 1 is a block diagram of a memory device in accordance with an embodiment of the invention. As shown in FIG. 1, the memory device 100 includes a memory controller 110 and a memory array 120. The memory controller 110 performs a write operation or a read operation on the memory array 120 according an operation command CMD generated by a host 10. The memory array 120 includes a first memory bank 121 and a second memory bank 122.

According to an embodiment of the invention, the memory array 120 is a static random access memory (SRAM). According to some embodiments of the invention, the host 10 is a central processing unit or any other data access device. According to other embodiments of the invention, a microcontroller includes the host 10 and the memory device 100, in which the host 10 is a central processing unit.

According to an embodiment of the invention, when the operation command CMD is a write command, the memory controller 110 writes the data DT transmitted by the host 10 into the first memory bank 121 and simultaneously writes the reverse data DTB into the second memory bank 122, in which the reverse data DTB is an reverse of the data DT. According to another embodiment of the invention, when the operation command CMD is a read command, the memory controller 110 simultaneously reads the data DT in the first memory bank 121 and the reverse data DTB in the second memory bank 122, and only transmits the data DT back to the host 10.

According to an embodiment of the invention, the data DT is confidential data. When the memory controller 110 performs the write operation and/or the read operation, the bit count of logic "0" being written and/or read is identical to that of logic "1" so that the power consumption for each write operation and/or read operation is identical so as to improve the security of data. However, in the sake of improving security, a half of the memory array 120 is configured to store the reverse data and the utilization rate of the memory array 120 is thus halved. According to an embodiment of the invention, the utilization rate of the memory device 100 is 50%. In the sake of improving the utilization rate of the memory array, other methods should be required to achieve data security.

Figure 2:
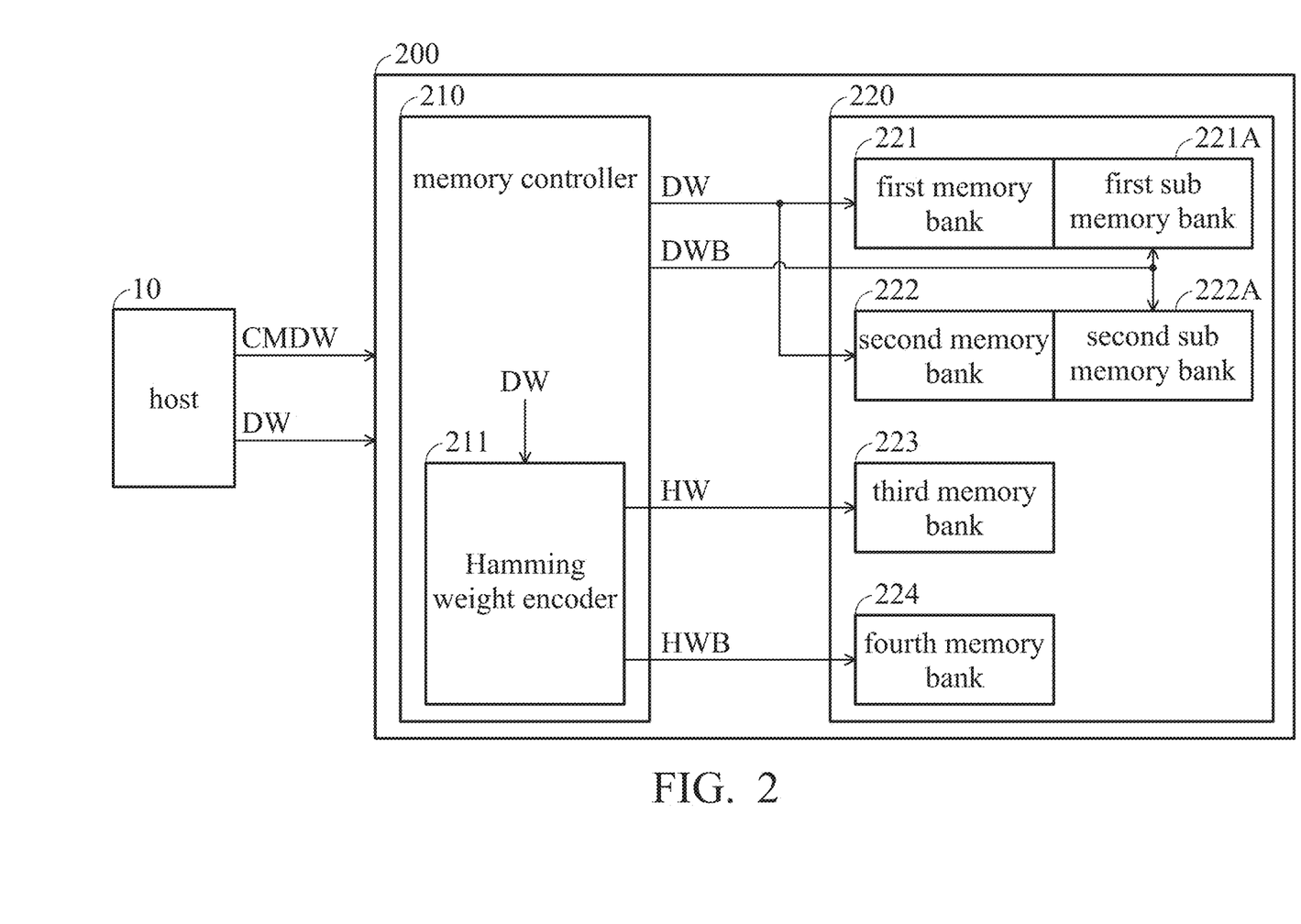
FIG. 2 is a block diagram of a memory device in accordance with another embodiment of the invention.

FIG. 2 is a block diagram of a memory device in accordance with another embodiment of the invention. As shown in FIG. 2, the memory device 200 includes a memory controller 210 and a memory array 220, in which the memory controller 210 performs the write operation on the memory array 220 according to the write command CMDW generated by the host 10. According to an embodiment of the invention, the memory array 220 is a SRAM. According to some embodiments of the invention, the host 10 is a central processing unit or any other data access device. According to other embodiments of the invention, a microcontroller includes the host 10 and the memory device 200, in which the host 10 is a central processing unit.

As shown in FIG. 2, the memory array 220 includes a first memory bank 221, a second memory bank 222, a third memory bank 223 and a fourth memory bank 224, in which the first memory bank 221 includes a first sub memory bank 221A and the second memory bank 221 includes a second sub memory bank 222A.

In the embodiment of FIG. 2, when the memory controller 210 receives the write command CMDW generated by the host 10, the memory controller 210, according to the write command CMDW, writes write data DW transmitted by the host into one of the first memory bank 221 or the second memory bank 222 and simultaneously writes the reverse write data DWB into one of the second sub memory bank 222A and the first sub memory bank 221A. The reverse write data DWB is the inverse of the write data DW.

In other words, when the memory controller 210 writes the write data DW into the first memory bank 221, the memory controller 210 simultaneously writes the reverse write data DWB into the second sub memory bank 222A; when the memory controller 210 writes the write data DW into the second memory bank 222, the memory controller 210 simultaneously writes the reverse write data DWB into the first sub memory bank 221A. Since the memory controller 210 simultaneously writes the write data DW and the reverse write data DWB into the memory array 220, the bit count of the written logic "1" is equal to that of the written logic "0" so as to improve data security.

According to some embodiments of the invention, when the memory controller 210 writes another write data (not shown in FIG. 2) into the first memory bank 221/the second memory bank 222, the memory controller 210 simultaneously writes the inverse of the other write data into the second sub memory bank 222A/the first sub memory bank 221A. Compared with the memory device 100 in FIG. 1, the space of the second sub memory bank 222A/the first sub memory bank 221A can be shrank to the size of the reverse data. Therefore, the memory space in the memory device 200 in FIG. 2 that can be written is increased so as to greatly improve the utilization rate of the memory array.

As shown in FIG. 2, the memory controller 210 further includes a Hamming weight encoder 211. According to an embodiment of the invention, when the memory controller 210 receives the write data DW, the Hamming weight encoder 211 counts the bit count of logic "1" in the write data DW to generate the Hamming weight HW. According to another embodiment of the invention, when the memory controller 210 receives the write data DW, the Hamming weight encoder 211 can also generate the Hamming weight HW by counting the bit count of logic "0" in the write data DW.

After the Hamming weight encoder 211 generates the Hamming weight HW, the Hamming weight encoder 211 further generates the reverse Hamming weight HWB, which is the inverse of the Hamming weight HW. Then, the memory controller 210 simultaneously writes the Hamming weight HW and the reverse Hamming weight HWB into the third memory bank 223 and the fourth memory bank 224 so as to balance the bit count of the written logic "1" and that of the written logic "0", in which the reverse Hamming weight HWB is the inverse of the Hamming weight HW.

According to an embodiment of the invention, when the memory controller 210 writes the write data DW into the first memory bank 221 and simultaneously writes the reverse write data DWB into the second sub memory bank 222A, the memory controller 210 further writes the Hamming weight HW into the third memory bank 223 and simultaneously writes the reverse Hamming weight HWB into the fourth memory bank 224.

According to another embodiment of the invention, when the memory controller 210 writes the write data DW into the second memory bank 222 and simultaneously writes the reverse write data DWB into the first sub memory bank 221A, the memory controller 210 also writes the Hamming weight HW into the third memory bank 223 and simultaneously writes the reverse Hamming weight HWB into the fourth memory bank 224.

According to an embodiment of the invention, the memory space of the first memory bank 121 and the second memory bank 122 in FIG. 1 is K*N bits; the memory space of the first memory bank 221 and the second memory bank 222 in FIG. 2 is K*N bits, the memory space of the first sub memory bank 221A and the second sub memory bank 222A is 1*N bits, and the memory space of the third memory bank 223 and the fourth memory bank 224 is $2K*(\log_2 N+1)$ bits. Since the memory space of the memory device 100 in FIG. 1 storing data other than the write data is K*N bits and that of the memory device 200 in FIG. 2 storing data other than the write data (i.e., the first sub memory bank 221A, the second sub memory bank 222A, the third memory bank 223, and the fourth memory bank 224) is $2*N+4K*(\log_2 N+1)$ bits. When N and K are far greater than 1, the utilization rate of the memory device 200 is close to 100%, which is much greater than the 50% utilization rate of the memory device 100 in FIG. 1.

Figure 3:
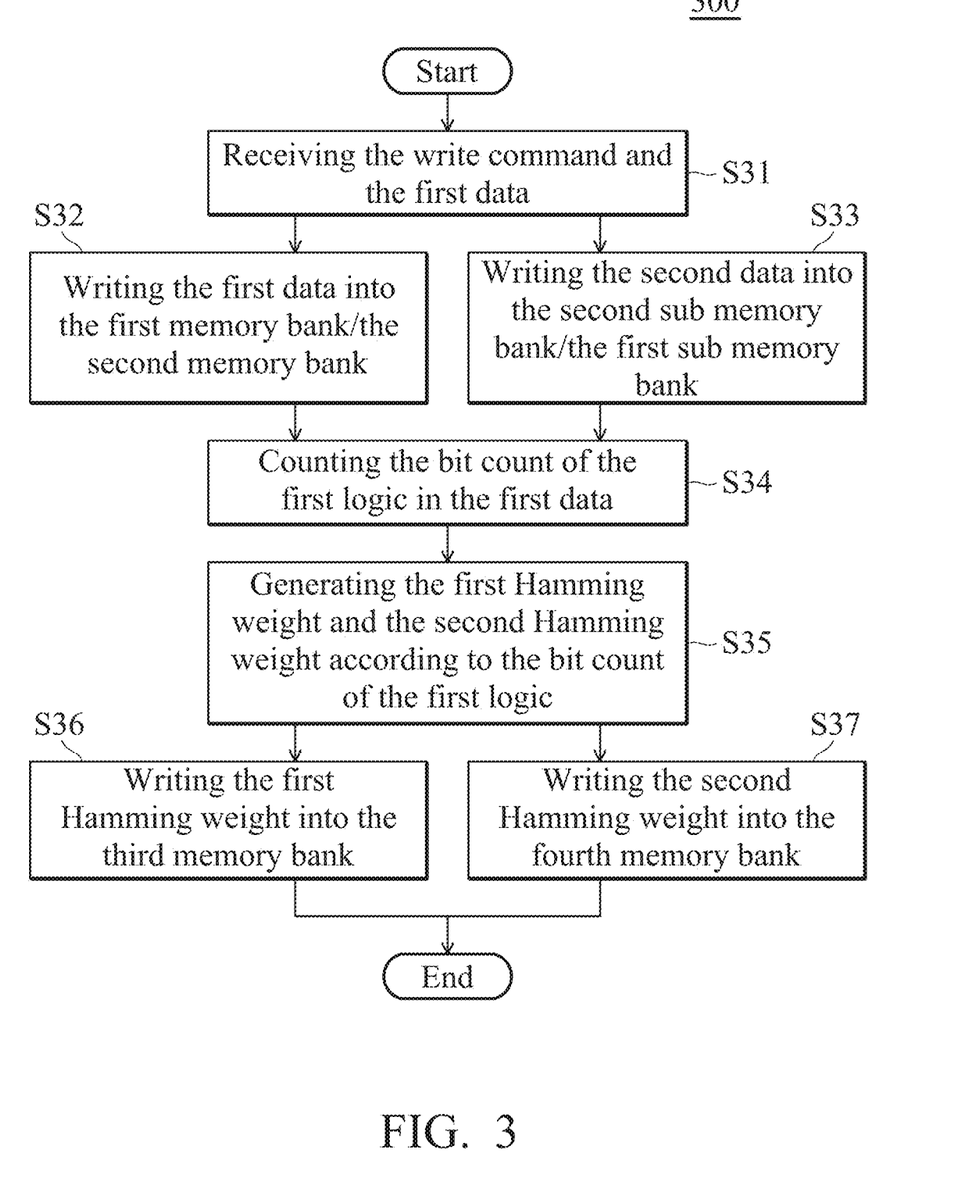
FIG. 3 is a flow chart of a writing method in accordance with an embodiment of the invention.

FIG. 3 is a flow chart of a writing method in accordance with an embodiment of the invention. The description of the writing method 300 in FIG. 3 in the following will be accompanied with the block diagram in FIG. 2 for the simplicity of explanation.

First, the memory controller 210 receives the write command CMDW generated by the host 10 and the first data (i.e., the write data DW) (Step S31). According to an embodiment of the invention, the memory controller 210 then writes the first data (i.e., the write data DW) into the first memory bank 221 (Step S32) and simultaneously writes the second data (i.e., the reverse write data DWB) into the second sub memory bank 222A (Step S33). According to another embodiment of the invention, the memory controller 210 writes the first data (i.e., the write data DW) into the second memory bank 222 (Step S32) and simultaneously writes the second data (i.e., the reverse write data DWB) into the first sub memory bank 221A (Step S33).

According to an embodiment of the invention, the first data (i.e., the write data DW) and the second data (i.e., the reverse write data DWB) are simultaneously written, which is configured to balance the bit count of the written logic "1" and that of the written logic "0".

Then, the Hamming weight encoder 211 of the memory controller 210 counts the bit count of the first logic in the first data (i.e., the write data DW) (Step S34), and the memory controller 210 generates the first Hamming weight (i.e., the Hamming weight HW) and the second Hamming weight (i.e., the reverse Hamming weight HWB) according to the bit count of the first logic (Step S35). According to an embodiment of the invention, the memory controller 210 generates the first Hamming weight (i.e., the Hamming weight HW) according to the bit count of the first logic and inverses the first Hamming weight to generate the second Hamming eight (i.e., the reverse Hamming weight HWB). According to an embodiment of the invention, the first logic may be logic "1". According to another embodiment of the invention, the first logic may be logic "0".

Then, the memory controller 210 writes the first Hamming weight (i.e., the Hamming weight HW) into the third memory bank 223 of the memory array (Step S36), and simultaneously writes the second Hamming weight (i.e., the reverse Hamming weight HWB) into the fourth memory bank 224 of the memory array 220 (Step S37), in which the second Hamming weight is the inverse of the first Hamming weight.

Figure 4:
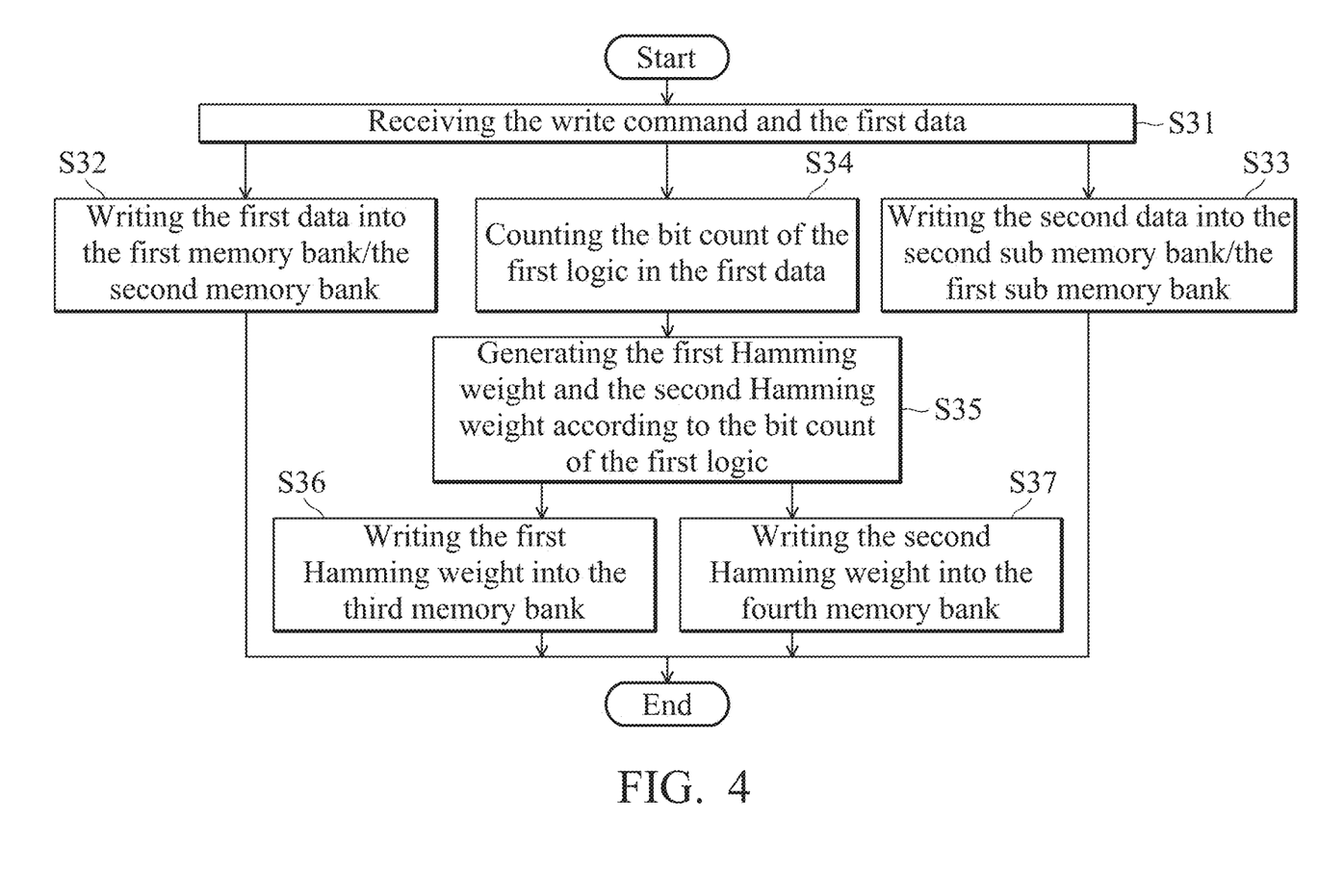
FIG. 4 is a flow chart of a writing method in accordance with another embodiment of the invention.

FIG. 4 is a flow chart of a write method in accordance with another embodiment of the invention. As shown in FIG. 4, Step S31 to Step S37 are identical to Step S31 to Step S37 in FIG. 3, in which Step S34 (i.e., counting the bit count of the first logic in the first data (i.e., the write data DW)) and Step S35 (i.e., generating the first Hamming weight (i.e., the Hamming weight HW) and the second Hamming weight (i.e., the reverse Hamming weight HWB) according to the bit count of the first logic using the memory controller 210) in FIG. 4 are executed in parallel with Step S32 and Step S33, so as to improve the speed of writing.

Figure 5:
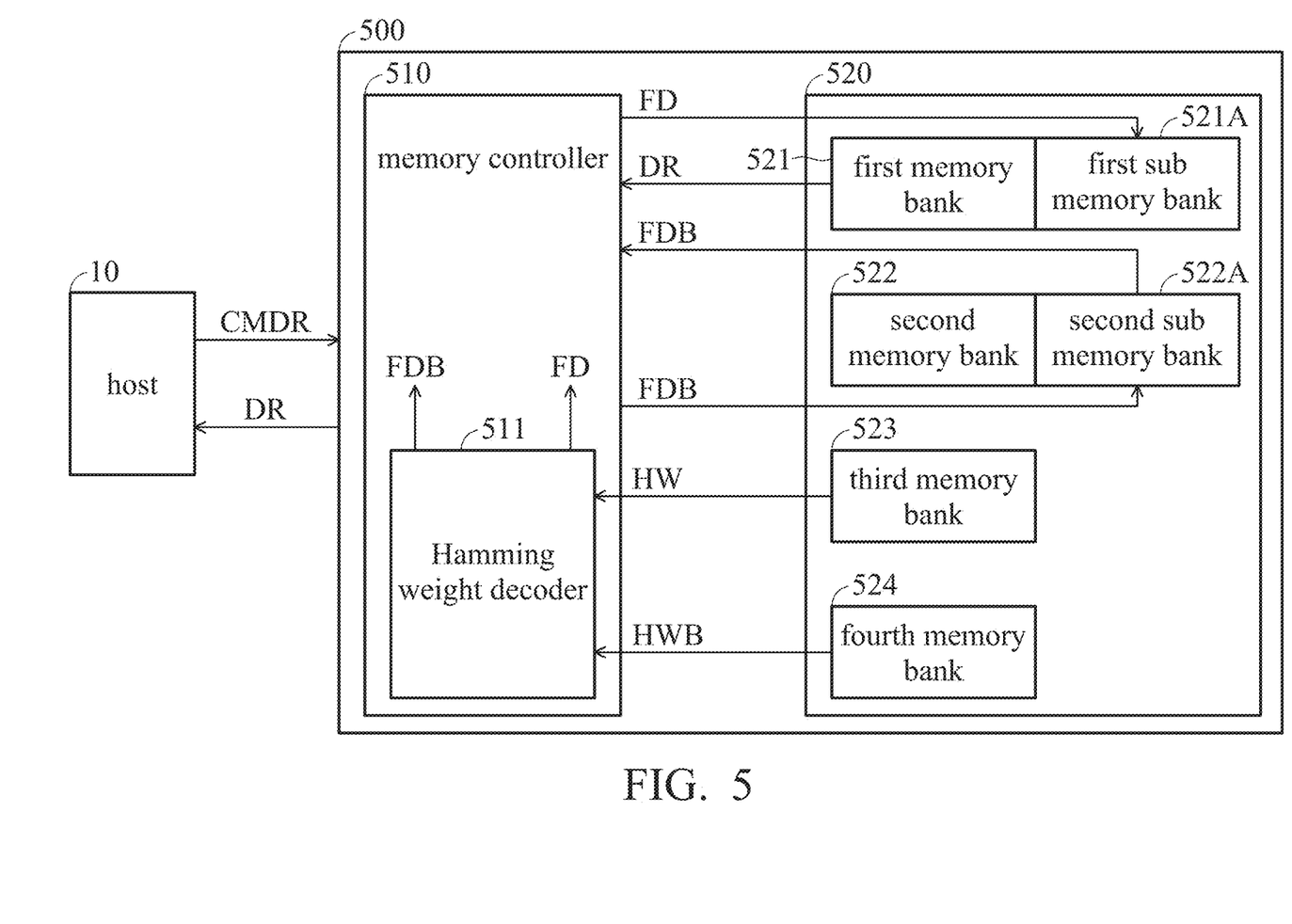
FIG. 5 is a block diagram of a memory device in accordance with another embodiment of the invention.

FIG. 5 is a block diagram of a memory device in accordance with another embodiment of the invention. As shown in FIG. 5, the memory device 500 includes a memory controller 510 and a memory array 520, in which the memory controller 510, according to the read command CMDR generated by the host 10, performs the read operation on the memory array 520. The memory array 520 corresponds to the memory array 220 in FIG. 2, which includes the first memory bank 521, the second memory bank 522, the third memory bank 523, and the fourth memory bank 524. The first memory bank 521 includes a first sub memory bank 521A, and the second memory bank 522 includes a second sub memory bank 522A.

In the embodiment of FIG. 5, when the memory controller 510 reads the read data DR stored in the first memory bank 521 according to the read command CMDR, the memory controller 510 reads the Hamming weight HW from the third memory bank 523, which corresponds to the read data DR, and simultaneously reads the reverse Hamming weight HWB from the fourth memory bank 524. The reverse Hamming weight HWB is the inverse of the Hamming weight HW.

When the memory controller 510 generates a fake data FD having the Hamming weight HW, the memory controller 510 writes the fake data FD into the first sub memory bank 521A and simultaneously writes the reverse fake data FDB into the second sub memory bank 522A, in which the reverse fake data FDB is the inverse of the fake data FD. Then, the memory controller 510 simultaneously reads the read data DR from the first memory bank 521 and the reverse fake data FDB from the second sub memory bank 522A.

According to another embodiment of the invention, when the memory controller 510 reads the read data DR from the second memory bank 522 (not shown in FIG. 5) according to the read command CMDR, the memory controller 510 reads the Hamming weight HW from the third memory bank 523, which corresponds to the read data DR, and simultaneously reads the reverse Hamming weight HWB from the fourth memory bank 524. When the memory controller 510 generates the fake data FD having the Hamming weight HW, the memory controller 510 writes the fake data FD into the second sub memory bank 522A and simultaneously writes the reverse fake data FDB, which is the inverse of the fake data FD, into the first sub memory bank 521A. Then, the memory controller 510 simultaneously reads the read data DR from the second memory bank 522 and the reverse fake data FDB from the first sub memory bank 521A.

According to an embodiment of the invention, since the Hamming weight HW and the reverse Hamming weight HWB are reverse to each other, the bit count of the read logic "1" and that of the read logic "0" can be balanced by simultaneously reading the Hamming weight HW and the reverse Hamming weight HWB so as to improve data security. According to an embodiment of the invention, since the read data DR and the fake data FD have the same Hamming weight HW, the memory controller 510 simultaneously reads the read data DR and the reverse fake data FDB to balance the bit count of the read logic "1" and that of the read logic "0", so as to improve data security.

According to some embodiments of the invention, when the memory controller 510 reads another read data from the first memory bank 521/the second memory bank 522 (not shown in FIG. 5), the memory controller 510 generates another reverse fake data corresponding to the other read data and writes the other fake data into the second sub memory bank 522A/the first sub memory bank 521A. Therefore, the memory space of the second sub memory bank 522A/the first sub memory bank 521A can be as large as the size of the reverse fake data. Compared with the memory device 100 in FIG. 1, the memory space of the memory device 500 in FIG. 5 that is readable is increased so that the utilization rate of the memory array has been greatly improved.

According to an embodiment of the invention, the memory controller 510 includes a Hamming weight decoder 511. The Hamming weight decoder 511 is configured to generate the fake data FD having the Hamming weight HW according to the Hamming weight HW and to invert the fake data FD to generate the reverse fake data FDB. According to some embodiments of the invention, since each of the read data DR and the fake data FD has the identical Hamming weight HW, it indicates that each of the read data DR and the fake data FD has the identical bit count of logic "1" and that of logic "0". According to some embodiments of the invention, even though each of the read data DR and the fake data FD has the identical Hamming weight HW, the read data DR may be identical, or different, to the fake data FD.

According to an embodiment of the invention, the memory space of the first memory bank 121 and the second memory bank 122 in FIG. 1 is K*N bits; the memory space of the first memory bank 521 and the second memory bank 522 in FIG. 5 is K*N bits, the memory space of the first sub memory bank 521A and the second sub memory bank 522A is 1*N bits, and the memory space of the third memory bank 523 and the fourth memory bank 524 is $2K*(\log_2 N+1)$ bits. Since the memory space of the memory device 100 in FIG. 1 storing data other than the write data is K*N bits and that of the memory device 500 in FIG. 5 storing data other than the write data (i.e., the first sub memory bank 521A, the second sub memory bank 522A, the third memory bank 523, and the fourth memory bank 524) is $2*N+4K*(\log_2 N+1)$ bits. When N and K are far greater than 1, the utilization rate of the memory device 500 in FIG. 5 is close to 100%, which is much greater than the 50% utilization rate of the memory device 100 in FIG. 1.

Figure 6:
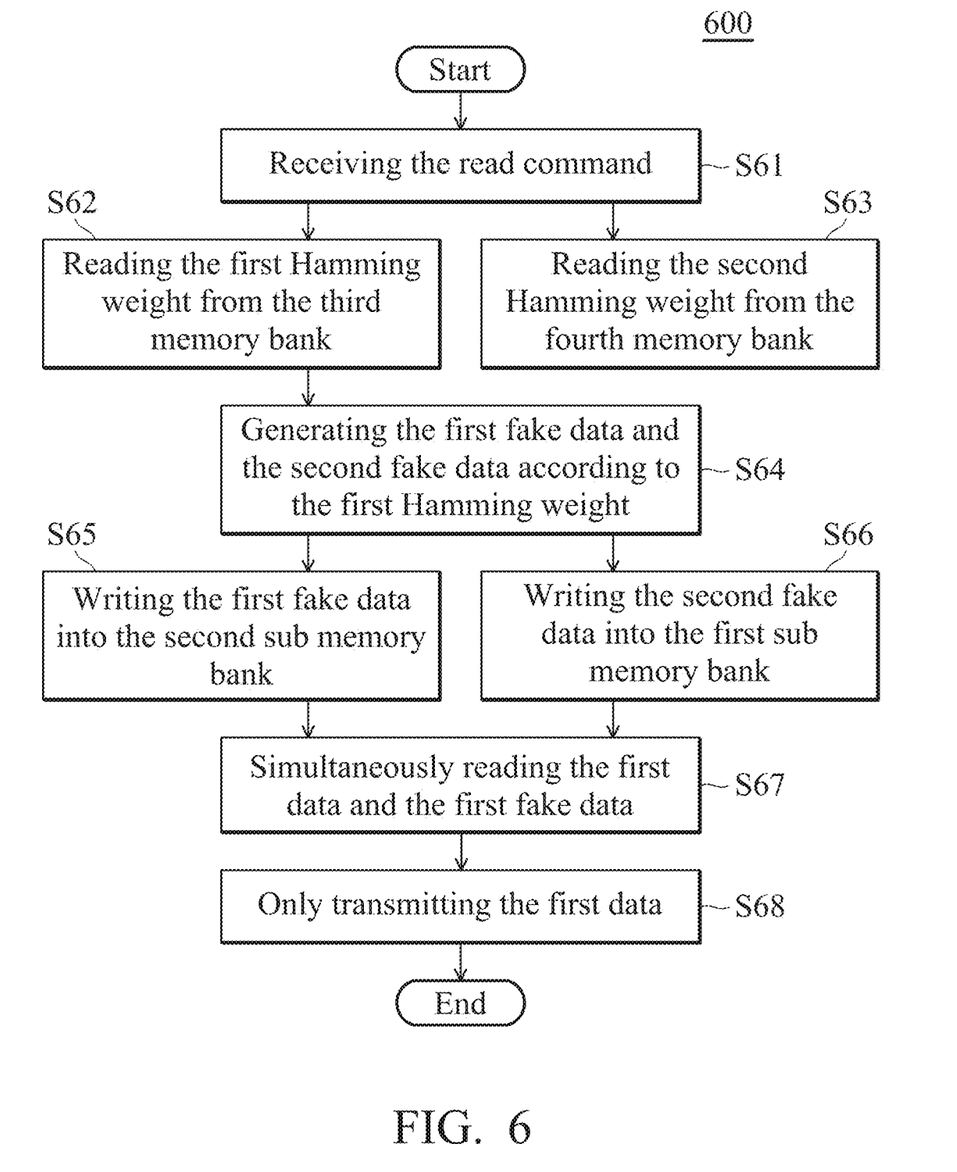
FIG. 6 is a flow chart of a reading method in accordance with an embodiment of the invention.

FIG. 6 is a flow chart of a reading method in accordance with an embodiment of the invention. The description of the read method 600 in FIG. 6 in the following will be accompanied with the block diagram in FIG. 5 for the simplicity of explanation.

First, the memory controller 510 receives the read command CMDR generated by the host 10 (Step S61) to read the first data (i.e., the read data DR) from the first memory bank 521 of the memory array 520. Then, the memory controller 510 reads the first Hamming weight (i.e., the Hamming weight HW) from the third memory bank 523 (Step S62), in which the first Hamming weight (i.e., the Hamming weight HW) represents that the first data (i.e., the read data DR) has a first bit count of the first logic and a second bit count of the second logic. According to an embodiment of the invention, the first logic is logic "1" and the second logic is logic "0". According to another embodiment of the invention, the first logic is logic "0" and the second logic is logic "1".

When the first Hamming weight is read (Step S62), the memory controller 510 simultaneously reads the second Hamming weight (i.e., the reverse Hamming weight HWB) from the fourth memory bank 524 of the memory array 520 (Step S63). According to an embodiment of the invention, the first Hamming weight (i.e., the Hamming weight HW) and the second Hamming weight (i.e., the reverse Hamming weight HWB) are simultaneously read so that the bit count of the read logic "1" and that of the read logic "0" are identical so as to improve data security.

After Step S62, the Hamming weight decoder 512 generates, according to the first Hamming weight (i.e., the Hamming weight HW), the first fake data (i.e., the reverse fake data FDB) and the second fake data (i.e., the fake data FD) (Step S64). The first fake data (i.e., the reverse fake data FDB) has a second bit count of the first logic and a first bit count of the second logic, and the second fake data (i.e., the fake data FD) has the first bit count of the first logic and the second bit count of the second logic. In other words, each of the first data (i.e., the read data DR) and the second fake data (i.e., the fake data FD) has the identical bit count of logic "1" and the identical bit count of logic "0", in which the first fake data is the inverse of the second fake data.

According to an embodiment of the invention, the Hamming weight decoder 511 generates the second fake data (i.e., the fake data FD) having the first Hamming weight (i.e., the Hamming weight HW) and inverses the second fake data (i.e., the fake data FD) to generate the first fake data (i.e., the reverse fake data FDB).

Then, the memory controller 510 writes the first fake data (i.e., the reverse fake data FDB) into the second sub memory bank 522A (Step S65) and simultaneously writes the second fake data (i.e., the fake data FD) into the first sub memory bank 521A (Step S66). According to an embodiment of the invention, since the first fake data (i.e., the reverse fake data FDB) has the second bit count of the first logic and the first bit count of the second logic and the second fake data (i.e., the fake data FD) has the first bit count of the first logic and the second bit count of the second logic, Step S65 and Step S66 are simultaneously performed so that a sum of the first bit count and the second bit count of the first logic and the second logic are simultaneously written, so as to improve data security.

Then, the memory controller 510 simultaneously reads the first data (i.e., the read data DR) and the first fake data (i.e., the reverse fake data FDB) (Step S67) to balance the bit count of the read logic "1" and that of the read logic "0". Finally, the memory controller 510 only transmits the first data (i.e., the read data DR) to the host 10 (Step S68) to finish the read method 600.

According to another embodiment of the invention, when the read command CMDR received in Step S61 is configured to read the first data (i.e., the read data DR) from the second memory bank 522 of the memory array 520, the first Hamming weight (i.e., the Hamming weight HW) is read from the third memory bank 523 in Step S62 and the second Hamming weight (i.e., the reverse Hamming weight HWB) is read from the fourth memory bank 524 of the memory array 520 in Step S63. Then, the memory controller 510 writes the first fake data (i.e., the reverse fake data FDB) into the first sub memory bank 521A in Step S65, and simultaneously writes the second fake data (i.e., the fake data FD) into the second sub memory bank 522A.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A write method adapted to a memory array, wherein the memory array comprises a first memory bank and a second memory bank, wherein the first memory bank comprises a first sub memory bank and the second memory bank comprises a second sub memory bank, wherein the write method comprises:
receiving a write command and first data from a host;
writing the first data into the first memory bank and simultaneously writing second data into the second sub memory bank, wherein the second data is the inverse of the first data;
writing a first Hamming weight of the first data into a third memory bank of the memory array; and
writing third data from the host into the first memory bank and fourth data into the second sub memory bank according to another write command from the host, wherein the fourth data is an inverse of the third data,
wherein correct data is written into a non-specific sub memory bank of the first memory bank, and incorrect data is written into a specific sub memory bank of the second memory bank, and
wherein the incorrect data is an inverse of the correct data, and the specific sub memory bank is the second sub memory bank.

2. The write method as defined in claim 1, further comprising:
generating a second Hamming weight, wherein the second Hamming weight is the inverse of the first Hamming weight; and
when writing the first Hamming weight of the first data into the third memory bank of the memory array, simultaneously writing the second Hamming weight into the fourth memory bank of the memory array.

3. A memory device, comprising:
a memory array, comprising:
a first memory bank, comprising a first sub memory bank;
a second memory bank, comprising a second sub memory bank; and
a third memory bank; and
a memory controller, simultaneously writing first data from a host into the first memory bank and second data into the second sub memory bank according to a write command from the host, and writing a first Hamming weight of the first data into the third memory bank,
wherein the second data is an inverse of the first data,
wherein the memory controller further writes third data from the host into the first memory bank and fourth data into the second sub memory bank according to another write command from the host,
wherein the fourth data is an inverse of the third data,
wherein the memory controller writes correct data into a non-specific sub memory bank of the first memory bank, and writes incorrect data into a specific sub memory bank of the second memory bank, and
wherein the incorrect data is an inverse of the correct data, and the specific sub memory bank is the second sub memory bank.

4. The memory device as defined in claim 3, wherein the memory device further comprises:

a fourth memory bank, configured to store a second Hamming weight, wherein the second Hamming weight is the inverse of the first Hamming weight, wherein the memory controller simultaneously writes the first Hamming weight into the third memory bank and the second Hamming weight into the fourth memory bank.

5. The memory device as defined in claim 4, wherein the memory controller further comprises:
a Hamming weight decoder, configured to count the first data having a first bit count of a first logic to generate the first Hamming weight according to the first bit count, and to generate the second Hamming weight.

6. The memory device as defined in claim 4, wherein when the memory controller receives a read command from the host to read the first data from the first memory bank, the memory controller simultaneously reads the first Hamming weight from the third memory bank and the second Hamming weight from the fourth memory bank, wherein the memory controller generates first fake data according to the first Hamming weight, writes the first fake data into the first sub memory bank and writes second fake data into the second sub memory bank, wherein the second fake data is the inverse of the first fake data, and the memory controller simultaneously reads the first data and the second fake data and transmits the first data to the host.

7. The memory device as defined in claim 6, wherein the memory controller further comprises:
a Hamming weight decoder, generating the first fake data having the first Hamming weight and generating the second fake data, wherein the second fake data is the inverse of the first fake data, wherein each of the first data and the first fake data has a first bit count of a first logic and a second bit count of a second logic.

8. A reading method adapted to a memory array, wherein the memory array comprises a first memory bank storing first data, a second memory bank and a third memory bank storing a first Hamming weight of the first data, wherein the first memory bank comprises a first sub memory bank and the second memory bank comprises a second sub memory bank, wherein the reading method comprises:
receiving a read command from a host to read the first data from the first memory bank;
reading the first Hamming weight, wherein the first Hamming weight indicates that the first data has a first bit count of a first logic and a second bit count of a second logic;
generating first fake data according to the first Hamming weight, wherein the first fake data has the first bit count of the second logic and the second bit count of the first logic;
writing the first fake data into the second sub memory bank; and
simultaneously reading the first data and the first fake data.

9. The reading method as defined in claim 8, further comprising:
when reading the first Hamming weight, simultaneously reading a second Hamming weight from a fourth memory bank of the memory array, wherein the second Hamming weight is the inverse of the first Hamming weight; and
after the step of simultaneously reading the first data and the first fake data, only transmitting the first data to the host.

10. The reading method as defined in claim 8, wherein the step of generating the first fake data according to the first Hamming weight further comprises:
generating second fake data according to the first Hamming weight, wherein the second fake data has the first bit count of the first logic and the second bit count of the second logic; and
inversing the second fake data to generate the first fake data.

* * * * *